United States Patent [19]

Reed

[11] 4,299,395
[45] Nov. 10, 1981

[54] GEOTHERMAL WELL HEAD ASSEMBLY

[76] Inventor: Lehman T. Reed, 2505 Chester St., Bakersfield, Calif. 93301

[21] Appl. No.: 142,105

[22] Filed: Apr. 21, 1980

[51] Int. Cl.³ .......................... E16J 15/18; E21B 23/00
[52] U.S. Cl. ........................................ 277/12; 277/31;
277/64; 277/112; 166/84; 166/85; 166/77.5;
166/315
[58] Field of Search .......................... 166/77.5, 82–88,
166/315; 277/12, 30, 31, 64, 112

[56] References Cited

U.S. PATENT DOCUMENTS

| | | | |
|---|---|---|---|
| 1,627,945 | 5/1927 | Wigle | 166/84 |
| 1,867,321 | 7/1932 | McEvoy | 166/85 X |
| 2,069,443 | 2/1937 | Hill | 277/64 X |
| 2,219,064 | 10/1940 | Boyer et al. | 277/64 X |
| 2,292,543 | 8/1942 | Patterson | 277/125 X |
| 2,954,742 | 10/1960 | Williams | 166/86 X |
| 3,478,826 | 11/1969 | Barnes | 166/84 X |
| 4,157,186 | 6/1979 | Murray et al. | 277/31 |

Primary Examiner—Robert S. Ward, Jr.
Attorney, Agent, or Firm—William C. Babcock

[57] ABSTRACT

A geothermal well head assembly that is removably mounted on the upper flanged end of a surface string of casing that is submitted in the upper portion of a bore hole that extends to the heated zone. A second string of casing is concentrically disposed in the first casing and extends to the heated zone, which second string of casing tends to expand and contract longitudinally to the first string. A rigid ring is disposed in the annulus space between the first and second strings of casing adjacent the ground surface and first and second resilient seals in pressure contact with the interior surface of the first casing and exterior surface of the second casing. Means are provided for periodically and independently adjusting the compression on these seals from the exterior of the assembly without shutting down the geothermal well, which shut down is undesirable as possibly having an adverse effect on future production from the well.

3 Claims, 4 Drawing Figures

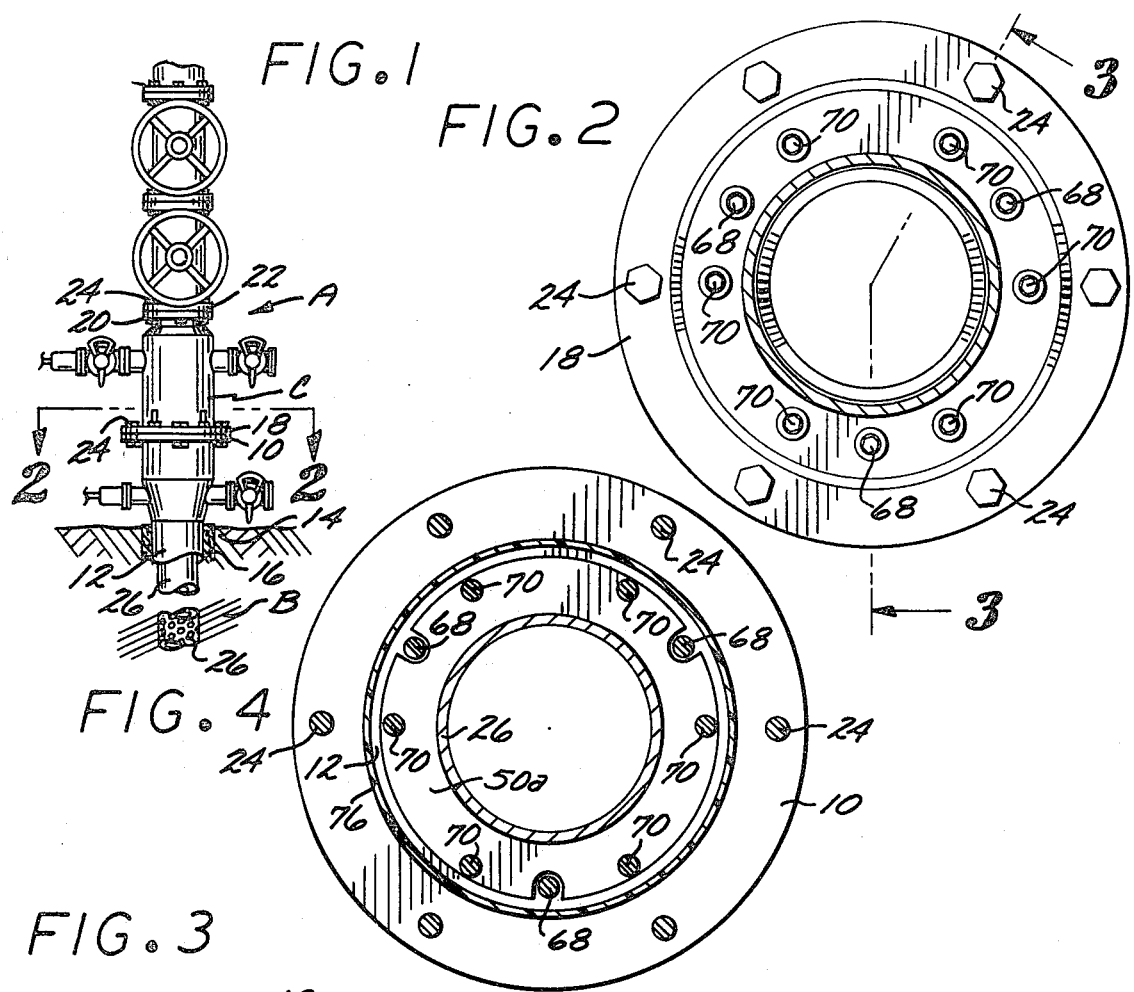
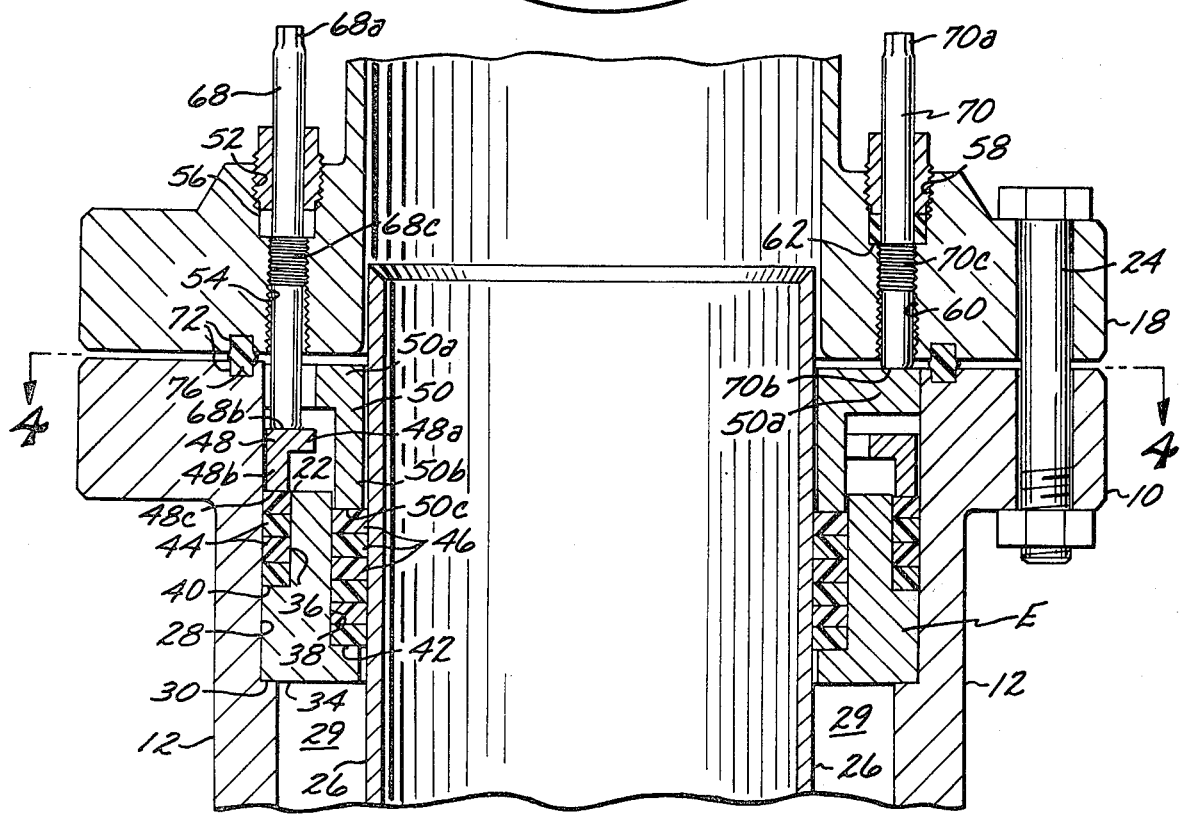

GEOTHERMAL WELL HEAD ASSEMBLY

BACKGROUND OF THE INVENTION

1. Field of the Invention

Improved Geothermal Well Head Assembly.

2. Description of the Prior Art

In recent years, due to the uncertainty of petroleum and natural gas as a source of energy, the production of power from geothermal wells has taken on increased importance. A troublesome problem in the production of geothermal energy, is maintaining a seal at the well head between the ambient atmosphere and the interior of the valve manifold through which the heated fluid from the geothermal zone flows.

The difficulty in so maintaining the seal is due to the substantial longitudinal and expansion and contraction that takes place in the casing or tubing string through which heated fluid flows relative to the stationary well head assembly. In the past it has been common practice to employ multiple groups of resilient rings to effect the seal to allow for such expansion and contraction, with the groups of rings having the same force exerted thereon to radially expand the same. Such a mode of sealing has been found unsatisfactory in that there is no correlation between the forces exerted on the two groups of resilient rings, and as a result an excessive force may be exerted on one group and an insufficient force on the other group. A major object of the present invention is to furnish a geothermal well head assembly that allows longitudinal expansion and contraction of the string of casing that extend to the producing zone relative to the surface string of casing by the use of compressed first and second resilient seals, and the seals having first and second manually operated means operatively associated therewith that may be periodically used to independently adjust the compression on the seals without shutting down the well.

The shutting down of a geothermal well by pumping heavy mud downwardly in the bore hole thereof is highly undesirable as the future productivity of the well may be impaired, and in some instances ruined.

SUMMARY OF THE INVENTION

The geothermal well head assembly of which the present invention forms a part includes the first flange which is located on the upper extremity of a first casing that is cemented in and extends down a well bore to communicate with a heated fluid producing zone. The assembly also includes a spool that has second and third flanges on the ends thereof. A valved manifold is provided that has the fourth flange on the lower end thereof. A number of bolts removably secure the second flange to the first flange and the fourth flange to the third flange. A second casing is provided that has an upper end that is so disposed that the upper end extends above the first flange. The second casing has an external diameter that is substantially smaller than the internal diameter of the first casing in which it is disposed, and the two casings defining an annulus space therebetween. The second casing has a lower end thereof in communication with the heated fluid producing zone.

The geothermal well head assembly of the present invention allows the second casing to expand and contract longitudinally due to variations in the temperature thereof, and this expansion and contraction taking place while a primary and secondary seal is maintained, with these seals preventing undesired communication between the ambient atmosphere and the interior of the well head assembly.

The well head assembly is characterized by the first flange having an interior cylindrical surface of the same diameter as a cylindrical recess in the upper portion of the first string of casing that is situated directly therebelow, which recess terminates at the bottom thereof in a first circular body shoulder. The second flange has a number of equally spaced internally threaded first bores and also a number of equally spaced second threaded bores therein.

A first rigid ring is disposed in the annulus space and rests on the body shoulder. The first ring has a first and a second circular slot that extends downwardly therein, and in which first and second groups of resilient sealing rings are disposed. The first group of sealing rings when compressed expands radially into pressure sealing contact with the surface of the recess in the first casing. The second group of sealing rings when compressed deform radially to pressure contact the exterior surface of the second casing and maintain a seal therewith as the second casing expands and contracts longitudinally due to variations in the temperature thereof.

A second ring of transverse inverted L-shaped cross-section is slidably mounted in the annulus space and has the lower portion in contact with the uppermost one of the first sealing rings. A third ring of transverse inverted L-shaped cross-section is disposed in the annulus space and has the lower portion in contact with the uppermost one of the second sealing ring.

First and second externally threaded force exerting members are in engagement with the first and second tapped bores in the second flange, and with the lower ends of the first and second members in contact with the upper surfaces of the second and third rings.

By rotating the first and second force exerting members the second and third rings may be moved downwardly independently of one another to compress the first and second resilient rings and expand the same radially to effect seals with the interior surface of the first casing and exterior surface of the second casing. The first and second seals may accordingly be periodically adjusted as to the compressive force thereon without shutting down the geothermal well, and thus eliminating the possibility that the future productivity of the well will be impaired or ruined as may occur when prior art geothermal well head assemblies are used.

BRIEF DESCRIPTION OF THE DRAWINGS

FIG. 1 is a side elevational view of a geothermal well head assembly that includes the present invention;

FIG. 2 is a combined top plan view and transverse cross sectional view of the assembly taken on the line 2—2 of FIG. 1;

FIG. 3 is a longitudinal cross-sectional view of a portion of the assembly taken on the line 3—3 of FIG. 2; and FIG. 4 is a combined top plan view and transverse cross-sectional view of the assembly taken on the line 4—4 of FIG. 3.

DESCRIPTION OF THE PREFERRED EMBODIMENT

In FIG. 1 a well head assembly A is shown that includes the present invention. The assembly A includes a first flange 10 that is mounted on the upper end of a first string of casing 12 that extends downwardly in a geothermal well bore 14 and is enveloped in cement 16 within the bore hole. The bore hole extends to a geothermal zone B from which heated fluid is produced. A second flange 18 is secured to the lower end of a spool C, with the upper end of the spool having a third flange 20 affixed thereto. A valve manifold D is provided as may best be seen in FIG. 1 that has a fourth flange 22 on the lower end thereof, with the flanges 22 and 20 being held together by bolts 24, and the first and second flanges 10 and 18 likewise being secured to one another by bolts 24. A second casing 26 is concentrically disposed within the first casing, with the second casing extending downwardly to the geothermal zone B and having the lower end at a fixed position relative to this zone. As the second casing 26 is alternately heated and cooled by variations in the flow of geothermal fluid therethrough, this second casing expands and contracts longitudinally relative to the first casing 12. The first flange 10 has a cylindrical interior surface that is the same diameter as a recess 28 that extends downwardly a short distance in the upper portion of the first casing, with the recess terminating at the lower end thereof in a first body shoulder 30. The interior surface of the first casing 12 and the exterior surface of the second casing 26 are separated by an annulus space 29. A first rigid ring E is provided that is mounted in the annulus space 29, and the first ring resting on the body shoulder 30 as may best be seen in FIG. 3.

The first ring E has a top 32, bottom 34, and first and second circular slots 36 and 38 that extend downwardly from the top thereof, as may best be seen in FIG. 3, with the first and second slots having second and third body shoulders 40 and 42 at the bottom thereof.

A number of first resilient packing rings 44 are stacked one above the other in the first slot 36 as shown in FIG. 3, and a number of second resilient sealing rings 46 are disposed within the second slot 38 and situated one above the other. A first ring-shaped force transmitting member 48 is disposed in the annulus-space 29, and is of inverted L-shaped transverse cross-section, and includes a horizontal leg 48a, vertical leg 48b, with the leg 48b terminating in a flat lower surface 48c that rests on the uppermost one of the first sealing rings 44.

A second force transmitting member 50 is provided and situated in the annulus shaped space 29, with the second member being of transverse inverted L-shaped cross-section. The second force transmitting member 50 includes a horizontal leg 50a, a vertical leg 50b, and the vertical leg terminating in a flat lower surface 50c that rests on the uppermost one of the second resilient rings 46 as may be seen in FIG. 3. The second flange 18 has a number of equally spaced first threaded bores 52 extending downwardly therein that are axially aligned with first counterbores 54 that are also internally threaded and extend upwardly in the flange, with the bores and counterbores at the junction defining second circular body shoulders 56. The second flange 18 also has a number of second bores 58 extending downwardly therein that are axially aligned with second upwardly extending counterbores, with the second bores and counterbores at their junction defining second circular body shoulders 62. A number of first externally threaded cylindrical bushings 64 are disposed in the first bores 52 and second bushings 66 in the second bores 58 as may best be seen in FIG. 3. A number of force elongate force exerting members 68 are provided that have wrench engageable upper end portions 68a, flat lower ends 68b, and threads 68c formed thereon intermediate the upper and lower ends. The threads 68c engage the first counterbores 54. Also, a number of elongate second force exerting members 70 are provided that have wrench engageable upper ends 70a, flat lower ends 70b, and threads 70c formed on the members intermediate the upper and lower ends, with the second counterbores 60. The first force exerting member 68 as may be seen in FIGS. 3 and 4 extend downwardly through recesses 72 defined in the longitudinal leg 50a of the second force transmitting member 50. The first and second flanges 10 and 18 have opposed recesses 74 defined therein in which a sealing ring 76 is disposed as shown in FIG. 3. The upper end of the second casing 26 extends above the upper surface of the first flange 10 as will be evident in FIG. 3.

The use and operation of the well assembly A as shown in FIG. 3 is extremely simple. When the well head assembly A is in an operative condition, as shown in FIG. 3, the second casing 26 has the upper end thereof disposed above the first flange 10. The first and second sealing rings 44 and 46 as may be seen in FIG. 3 effect a seal between the interior surface of the first casing 12 and the rigid ring E, as well as between the ring E and the exterior surface of the second casing 26. When it is desired to increase the compression on the first sealing rings 44, this is accomplished by compressing the rings downwardly to radially expand the same into pressure contact with the interior of the first casing 12 and the portion of the rigid ring E adjacent the first slot 36. This compression is achieved by rotating the first force exerting members 68 in a direction that they move downwardly relative to the second flange 18 and in so doing move the first force exerting ring 48 downwardly for the lower ends thereof to pressure contact the uppermost one of the first resilient ring 44.

When it is desired to adjust the compression on the second resilient rings 46 to radially expand the same into greater slidable pressure sealing contact with the second casing 26, and independent of the compressive force on the first sealing rings 44, the second force exerting members 70 are rotated in a direction to cause them to move downwardly relative to the second flange 18. As the force exerting members 70 move downwardly, the second force exerting ring is likewise moved downwardly to further compress the second sealing ring 46. From the above description it will be seen that the first and second sealing rings 44 and 46 may have the compression thereon periodically adjusted without shutting down the geothermal well, with potentially unfavorable results.

The use and operation of the invention has been described previously in detail and need not be repeated.

What is claimed is:

1. A geothermal well head assembly of the type that includes a first flange on the upper extremity of a first casing that is cemented in and extends down a well bore that is in communication with a heated fluid producing zone, said first flange having a cylindrical interior surface, a spool that includes second and third flange; a valved manifold that controls the flow of heated fluid from said zone which manifold has a fourth flange on the lower end thereof; a plurality of bolts that removably secure said second flange to said first flange, and said fourth flange to said third flange; a second casing that has an external diameter substantially smaller than the interior diameter of said first casing and concentrically disposed therein, said first and second casing defining an annulus shaped space therebetween, said second casing having an upper end adjacently disposed to said second flange and a lower end that occupies a fixed position relative to said heated fluid producing zone, said first casing having a longitudinally extending recess in the interior thereof below said cylindrical interior surface, said recess terminating at the bottom in a first circular body shoulder, said second flange having a plurality of circumferentially spaced first and second internally threaded bores therein, the improvement for adjustably effecting a seal between said first and second casing without shutting said well down that allows the latter to expand and contract longitudinally due to variations in the temperature thereof, said improvement comprising:

a. a plurality of first and second resilient sealing rings;

b. a first rigid ring disposed in said annulus space and resting on said first body shoulder, said first ring having a top from which first and second circular slots extend downwardly, said first slot adjacent said recess, and said second slot adjacent the exterior surface of said second casing, with at least one of said first sealing rings disposed in said first slot and at least one of said second sealing rings in said second slot;

c. a second rigid ring slidably movable in said annulus space above said first ring, said second ring including a downwardly projecting portion that contacts the upper surface of said first sealing ring;

d. a third rigid ring slidably movable in said annulus space and with at least the major portion thereof disposed above said second sealing ring;

e. a plurality of first and second elongate rigid force exerting members that have upper wrench engageable ends and lower flat force exerting ends, said first and second members having first and second threads thereon intermediate said upper and lower ends, said first threads engaging said first internally threaded bores and said first elongate members extending downwardly through recesses in said third ring for said lower end of said first elongate members to contact said second ring and said second threads engaging said second internally threaded bores to dispose said lower ends of said second elongate members in pressure contact with said third ring, with said first elongate members when rotated in a first direction moving downwardly relative to said second flange to move said second ring downwardly to compress said first resilient ring and radially deform the same into sealing contact with said recess and first rigid ring at a desired pressure, and said second elongate members when rotated in a first direction moving downwardly relative to said second flange to move said third ring downwardly to compress said second resilient ring and radially deform the same into sealing contact with said first rigid ring and the exterior surface of said second casing at a desired pressure, and the desired sealing pressures effected by said first and second sealing rings capable of being periodically varied by use of said first and second elongate members without shutting in said geothermal well.

2. A geothermal well head assembly as defined in claim 1 which said second rigid ring is of inverted L-shaped transverse cross-section and includes a first horizontal circular leg and a second vertical circular leg that bears against the upper surface of said first resilient sealing ring.

3. A geothermal well head assembly as defined in claim 1 in which said third rigid ring is of inverted L-shaped transverse cross-section and includes a first horizontal circular leg that has a plurality of circumferentially spaced recesses therein through which said first elongate members extend downwardly, and a second circular leg that bears against the upper surface of said second resilient sealing ring.

* * * * *